United States Patent [19]

Soref et al.

[11] Patent Number: 4,693,547
[45] Date of Patent: Sep. 15, 1987

[54] OPTICALLY CONTROLLED INTEGRATED OPTICAL SWITCH

[75] Inventors: Richard A. Soref, Newton Centre; Joseph P. Lorenzo, Stow, both of Mass.

[73] Assignee: The United States of America as represented by the Secretary of the Air Force, Washington, D.C.

[21] Appl. No.: 831,910

[22] Filed: Feb. 24, 1986

[51] Int. Cl.[4] .............................................. G02B 6/10
[52] U.S. Cl. ............................. 350/96.13; 350/96.14; 350/96.15; 350/354
[58] Field of Search ............... 350/96.11, 96.12, 96.13, 350/96.14, 96.15, 354

[56] References Cited

U.S. PATENT DOCUMENTS

| | | | |
|---|---|---|---|
| 3,810,688 | 5/1974 | Ballman et al. | 350/96 WG |
| 3,837,728 | 9/1974 | Logan et al. | 350/96 WG |
| 3,883,220 | 5/1975 | Taylor | 350/96 WG |
| 3,953,620 | 4/1976 | Chandross et al. | 427/53 |
| 4,003,629 | 1/1977 | Baues et al. | 350/96 C |
| 4,008,947 | 2/1977 | Baues et al. | 350/96 C |
| 4,013,000 | 3/1977 | Kogelnik | 350/96 C |
| 4,120,560 | 10/1978 | Baues et al. | 350/96.14 |
| 4,130,342 | 12/1978 | McMahon | 350/96.14 |
| 4,262,992 | 4/1981 | Berthold, III | 350/96.14 |
| 4,420,873 | 12/1983 | Leonberger et al. | 29/576 E |
| 4,472,020 | 9/1984 | Evanchuk | 350/96.12 |
| 4,597,638 | 7/1986 | Chemla et al. | 350/354 |

OTHER PUBLICATIONS

Neyer, A., "Electro-Optic X-Switch using Single-Mode Ti:LiNbO3 Channel Waveguides," *Electronic Letters*, Jul. 7, 1983, vol. 19, No. 14, pp. 553, 554.
Neyer et al., "Single-Mode Electrooptic X-Switch for Integrated Optic Switching Networks," Second European Conference on Integrated Optics, Florence, Italy, Conf. Proceedings, pp. 136-139, 1983.
Neyer, Andreas, "Operation Mechanism of Electrooptic Multimode X-Switches," IEEE Journal of Quantum Electronics, vol. QE-20, No. 9, Sep. 1984, pp. 999-1002.
Mikami, O. et al., "Waveguided Optical Switch in InGaAs/InP Using Free-Carrier Plasma Dispersion," *Electronics Letters*, Mar. 15, 1984, vol. 20, No. 6, pp. 228, 229.
Nakajima, H. et al., "Bipolar Voltage Controlled Optical Switch Using Ti LiNbO3 Intersecting Waveguides," Fourth Int. Conf. on Integrated Optics and Fiber Optic Communications (IOOC '83), Tokyo, Japan, *Conf. Proc.*, pp. 364, 365.
Pearce, C. W., Chapter 2, "VLSI Technology," edited by S. M. Sze, McGraw Hill, NY 1983.

*Primary Examiner*—Eugene R. LaRoche
*Assistant Examiner*—James C. Lee
*Attorney, Agent, or Firm*—Jacob N. Erlich; Donald J. Singer

[57] ABSTRACT

An optically controlled integrated optical switch having a body made up of entirely crystalline silicon. More specifically, the body has a pair of channel waveguides intersecting at an X-like configuration forming therein an intersection crossover region. An electrically controlled optical source is positioned over the crossover region to shine intense, short wavelight on the crossover region in order to generate numerous electron-hole pairs in the waveguide material. These charge carriers alter the refractive index of the intersection region. A controllable current source is used to adjust the optical output power of the optical source. This, in turn, changes the amount of optical cross coupling of light between the intersecting waveguides.

19 Claims, 7 Drawing Figures

OPTICALLY CONTROLLED INTEGRATED OPTICAL SWITCH

STATEMENT OF GOVERNMENT INTEREST

The invention described herein may be manufactured and used by or for the Government for governmental purposes without the payment of any royalty thereon.

BACKGROUND OF THE INVENTION

This invention relates generally to integrated optical circuits and the components making up such circuits, and, more particularly, to an integrated optical switch made completely of silicon and whose index of refraction is controlled by an external light-beam shining on the switch.

With recent increased development of lasers and optical fibers, more attention has been directed to integrated optical systems or circuits and the components which make up these circuits. Particular concern has been directed to the area of optical communciations which operate at a wavelength 1.3 µm and beyond and the integrated optical circuits which are utilized therein. Since it has been recognized that integrated optical components are capable of coupling efficiently to single-mode optical fibers, such integrated optical components become essential parts of fiber optic communication networks devoted to telecommunications or data communications applications. An excellent example of one such integrated component is the integrated optical switch which finds great utility in its ability to switch in a selected user at each local terminal of, for example, a local-area network.

As pointed out above, of major concern is the transmission of electromagnetic radiation (light) at the 1.3 µm to 1.55 µm wavelength area, the wavelengths at which propagation loss through an optical fiber is at a minimum. Switches are an essential component of such integrated optical circuits since it is required within the circuits to switch light energy from one guided-wave path to another.

Initially, mechanical switches which utilize deflecting mirrors positioned to intercept and redirect the light energy of a beam were utilized. These mechanical switches were replaced by more suitable optical components since speed of switching became an essential criteria in the building of optical communication circuit-networks.

Thereafter, integrated optical components became the preferred switching device. These switches followed two approaches:

(1) the formation of heterostructures using exotic alloys of InP on InP, and (2) LiNbO₃ components formed by titanium-ion indiffusion or by proton exchange.

Examples of integrated optical components in In-GaAsP/InP can be found in a paper by Mikami et al, "Waveguided Optical Switch In InGaAs/InP Using Free-Carrier Plasma Dispersion", *Electronic Letters*, Vol. 20, No. 6, Mar. 15, 1984, pp. 228 and 229, while examples of optical components utilizing Ti:LiNbO₃ can be found in a paper by A. Neyer, "Electro Optic X-Switch Using Single Mode Ti:LiNbO₃ Channel Waveguides", *Electronics Letters*, Vol. 19, No. 14, July 7, 1983, pp. 553 and 554.

There are many drawbacks associated with the formation of heterostructures using exotic alloys of InP on InP. For example, the alloy composition of InGaAsP must be chosen very carefully so that the lattice constant of the quaternary exactly matches the lattice constant of the host InP substrate: the growth apparatus and the growth techniques required to form the alloys are extremely complicated and may include such complex techniques as metal-organic chemical vapor deposition and molecular beam epitaxy; and it is necessary to grow sequentially alternating layers of different materials in order to form the multi-layer heterostructures that are essential in the above-mentioned devices.

The disadvantages with respect to the Ti:LiNbO₃ are also numerous. For example, it is difficult to control the diffusion depth and ionic concentration of the Ti ions; the waveguide profiles are semicircular, which is not at an optimum match to the circular fiber-core profile; and there are a number of stability problems associated with this material.

It is therefore clearly evident that there exists a need for improved optical switches, and in particular, it would be highly desireable to fabricate an integrated optical component which is not subject to the drawbacks associated with prior art optical components.

SUMMARY OF THE INVENTION

The present invention overcomes the problems encountered in the past as set forth in detail hereinabove by providing an optical component, more specifically, an integrated optical switch which utilizes a single element material in the form of crystalline silicon (x-Si) and which in conjunction therewith utilizes a variable-power light beam incident on the silicon body to control the index of refraction thereof. The controller light-beam has a shorter wavelength than the guided light.

The optically controlled integrated optical switch of the present invention is preferably operable with guided signals in the 1.3–1.55 µm wavelength region but may extend beyond. It is configured in an X-type channel waveguide structure wherein the intersection (or a wide crossing) therein is also fabricated of single-crystal silicon, for example, in an n-on-n⁺ (or intrinsic-on-n⁺) epitaxial structure.

A controlled alteration in the index of refraction of the intersection region of the switch is produced by the absorption of "shorter wavelength" light incident upon that region. This external light is absorbed largely within the n-type waveguiding region and creates therein a high concentration of electron-hole pairs because the controller wavelength is within the intrinsic absorption band of the semiconductor. This process creates an "optical injection" of carriers. The refractive index change is due (1) to the free-carrier plasma-dispersion effect, and (2) to the dynamic Burstein-Moss shift of the energy bands of the solid. Generally, the crossing angle of the channel waveguide is typically 3 to 4 degrees with the switch being capable of being cascaded into an N×N switch arrangement.

The particular material i.e. crystalline silicon utilized for the integrated optical switch of the present invention is essential and is novel in several respects. First, the switch is built entirely from one material (crystalline silicon) so there is no hetero-laying of one material on another material and there are no heterojunctions for injecting carriers.

Secondly, the silicon material does not exhibit the Pockels effect, but instead utilizes another electro-optical switching mechanism therein. This type of switching is accomplished (for example) by the passing an electric current through a miniature light source directed at the silicon intersection in order to alter the index of refraction thereof. Since silicon technology is extremely advanced, although not heretofore used in optical components, problems associated with the complexity of working with the exotic materials of the past have been completely eliminated.

More specifically, the optically controlled integrated optical switch of the present invention is made totally of crystalline silicon with the starting material being in the form of a high-resistivity single-crystal Si layer grown epitaxially on a heavily doped Si substrate. By photolithography and dry etching, the epi layer is formed into "rib or ridge" waveguides in an intersecting or X-pattern. By choosing the proper rib dimensions, each ridge guide will be a single-mode channel waveguide at the 1.3 or 1.55 μm wavelength.

Generally, the switch controller is an electrically controlled (modulated) light source (red, orange, or yellow in color), typically in the form of a miniature solid-state light-emitting diode with appropriate focusing optics to localize the emitted light beam. This unguided control light is normally incident (or at side incidence) upon the exposed surface of the rib-guide intersection. Adjustment of the light-source current enables optical switching to take place in the guided-wave structure.

It is therefore an object of this invention to provide a guided-wave integrated optical switch made entirely of crystalline silicon.

It is a further object of this invention to provide an integrated optical switch in which the index of refraction thereof (switching capability) is changed by the application of (the incidence of) a short-wavelength light beam upon the exposed silicon body.

It is still another object of this invention to provide an optically controlled integrated optical switch which is extremely simple to produce and which overcomes many of the manufacturing drawbacks of past integrated optical switches.

For a better understanding of the present invention, together with other and further objects, reference is made to the following description taken in conjunction with the accompanying drawings and its scope will be pointed out in the appended claims.

DETAILED DESCRIPTION OF THE PREFERRED EMBODIMENTS

Figure 1:
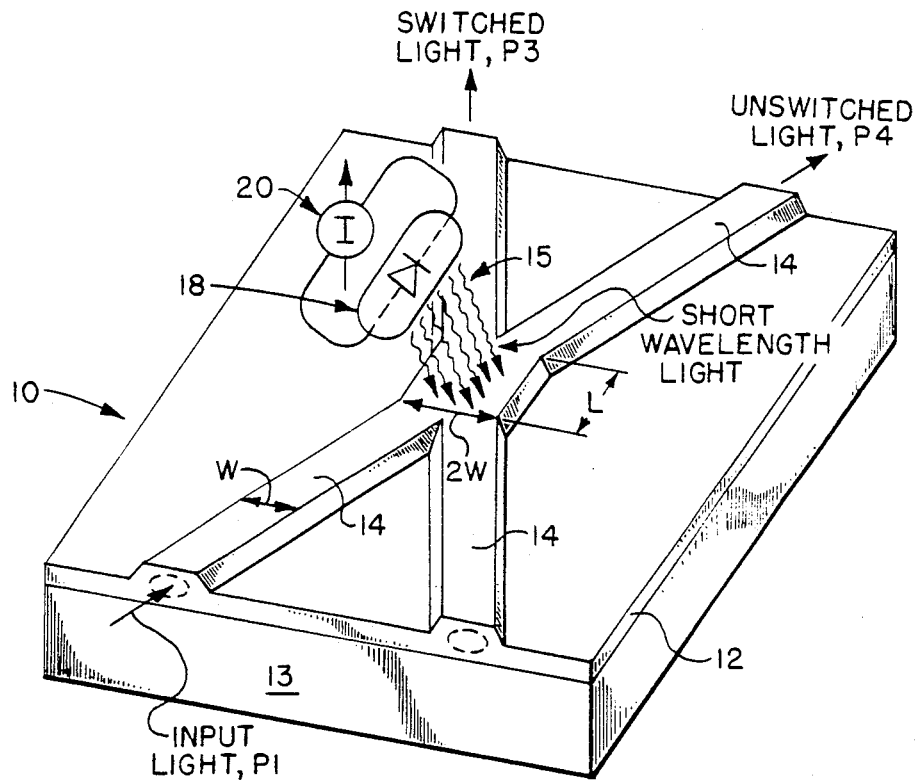
FIG. 1 is a pictorial representation of the optically controlled integrated optical switch of this invention.
Figure 2:
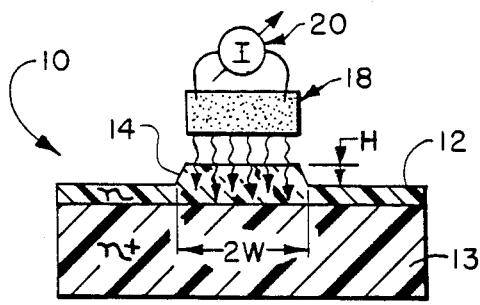
FIG. 2 is a cross sectional view of the optically controlled integrated optical switch of this invention.
Figure 3:
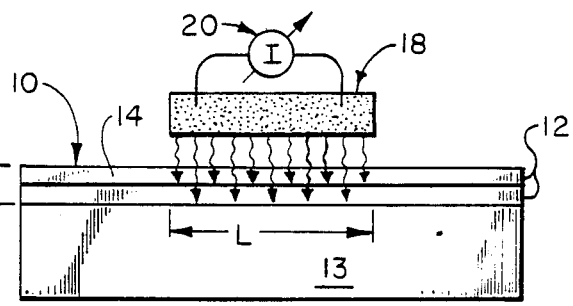
FIG. 3 is a side elevational view of the optically controlled integrated optical switch of this invention.

Reference is now made to FIGS. 1-3 of the drawings in which the optically controlled integrated optical switch 10 of the present invention is clearly depicted therein. It is essential in the present invention that the integrated-optical switch 10 be fabricated entirely of crystalline silicon, for example, in an n on n+ epitaxial structure (or in a p on p+ structure). More specifically, switch 10 is fabricated by starting with material in the form of a lightly doped single-crystal silicon layer 12 grown epitaxially on a heavily doped x-Si substrate 13. By photolithography and dry etching, the epi-layer 12 is formed into rib waveguides 14 in an intersecting X-like pattern 15. The doping of the higher-index n-type waveguide region is in the range of $10^{14}$ impurities/cm$^3$ and the lower index n substrate 13 has a doping of approximately $10^{19}$ cm$^{-3}$.

The input and output waveguides 14 illustrated in FIGS. 1-3 each support only a single mode at the 1.3 or 1.6 μm wavelength. Each rib waveguide 14 has a width, W, of 5 to 7 microns, an epitaxial layer 12 having a thickness, T, of about 5-10 microns (preferably 6 microns) and a rib height, H, of about 3 microns. In addition, the width of the waveguide intersection 15 is twice the width, 2W, of the single-mode input/output waveguides 14 so that this region will support two guided modes; an even and an odd mode (which is extremely useful for "clean" switching). The length of intersection region, L, is several hundred microns, typically less than 1 mm. Because of its efficient, low-crosstalk switching, the extended-X with double-width coupling region as clearly depicted in FIG. 1 of the drawings is the preferred embodiment of the present invention.

As pointed out above, it is essential that 2×2 switch 10 of the present invention be made entirely out of crystalline silicon (x-Si). The optical absorption losses in polycrystalline silicon and amorphous silicon are too high for practical devices, whereas, x-Si has very low loss. Although x-Si does not exhibit the Pockels effect, there are other important electro optical mechanisms in x-Si that are practical for optical switching, in particular, the optical-injection control mechanism of the present invention which is described in detail hereinbelow.

As illustrated in FIG. 1 of the drawings, a controlling light beam 16 emanates from any suitable light source 18 preferably in the 450 nm-950 nm wavelength range. Examples of light source 18 would be in the form of an individual light emitting diode (LED), an individual laser diode (LD), an array of LEDs or an array of LDs. It is possible, however, that controlling light source 18 could also be in the form of an incandescent source or gas laser, if desired. A typical source 18 utilized with the present invention would be a conventional, compact, monolithic LD array with approximately 50 mW or more of optical output power.

As shown in FIG. 1, light source 18 shines beam 16 on intersection 15 at 90 degrees to the face thereof. This light beam 16 essentially fills the entire intersection area 15 having an area defined by 2 WL. The present invention would also be operable if the intersection area 15 was filled only 50%, that is, covering an area defined by WL. As illustrated in FIGS. 1-3, optical source 18 is actuated by any conventional variable-current electrical controller 20 that determines the amount of optical power emitted by optical source 18, that is, source 18 is directly modulated or current-modulated. Consequently, in effect, the optically controlled integrated optical switch 10 of the present invention is varied electrically.

Figure 4:
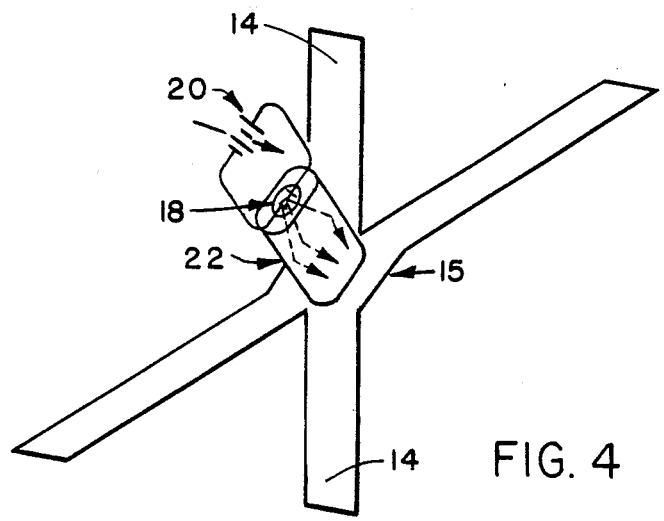
FIG. 4 is a pictorial plan view of the rib waveguides of the optically controlled integrated optical switch of this invention showing a quasi-point-source and dielectric-rod focusser.
Figure 5:
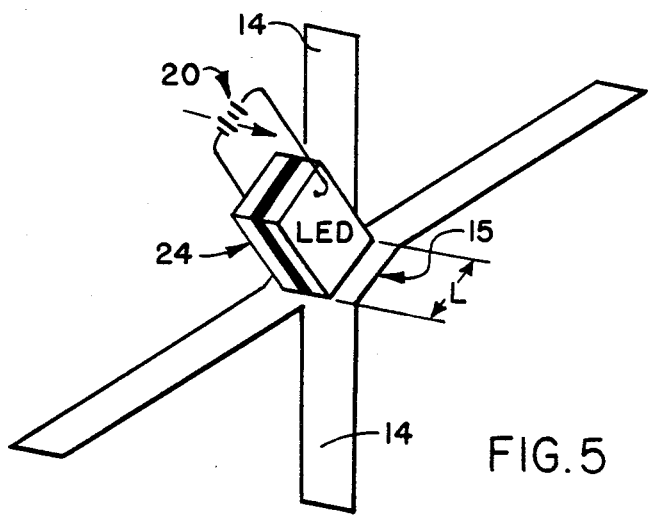
FIG. 5 is a pictorial plan view of the rib waveguides of the optically controlled integrated optical switch of this invention showing an edge-emitting optical source controller in near-contact with the switch.
Figure 6:
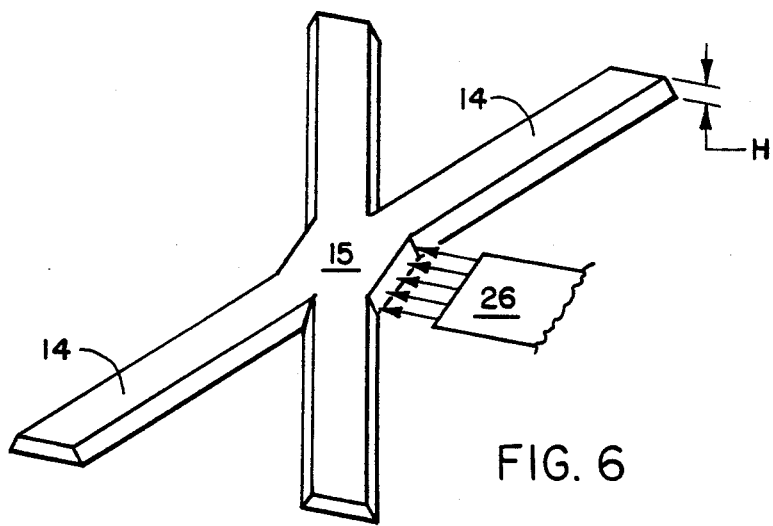
FIG. 6 is a pictorial plan view of the rib waveguides of the optically controlled integrated optical switch of this invention showing control light entering the side of the intersection via a ribbon-like optical waveguide.

Still referring to FIGS. 1–3 of the drawings, the coupling region or intersecting area 15 of optical switch 10 is defined by 2 WL wherein an optimum dimension would be W=6 micrometers and L=700 micrometers. If optical source 18 has a smaller emitting area than defined above, then it is necessary to use appropriate focusing optics or light-piping optics as illustrated in FIGS. 4–6 of the drawings in order to fill the 2 WL intersection area 15. FIG. 4 illustrates a ribbon-like dielectric rod waveguide 22 that provides a rectangular output from an individual LED/LD optical source 18.

Alternatively, in order to eliminate the optics as defined above, reference is made to FIG. 5 wherein is shown an edge-emitting LED 24 (or linear LD array) of length L placed in near-contact with the intersection area 15 for an appropriate area match. Another method of controlling the amount of light into the epitaxial waveguide intersection area 15 is illustrated in FIG. 6 of the drawings. Such an approach utilizes the fact that the rib waveguide 14 has smooth vertical walls that have a height, H, approximatey 3 micrometers thereby allowing light to enter the side of the intersection area 15 rather than entering the top as illustrated in the previous figures of the drawings. In order to provide the appropriate control light in such an instance a ribbon-type waveguide 26 injects the control light emanating from an optical source (not shown) into the side of the intersection area 15. As pointed out above, this control guide 26 can be in the form of a ribbon dielectric or a linear array of single mode optical fibers.

Figure 7:
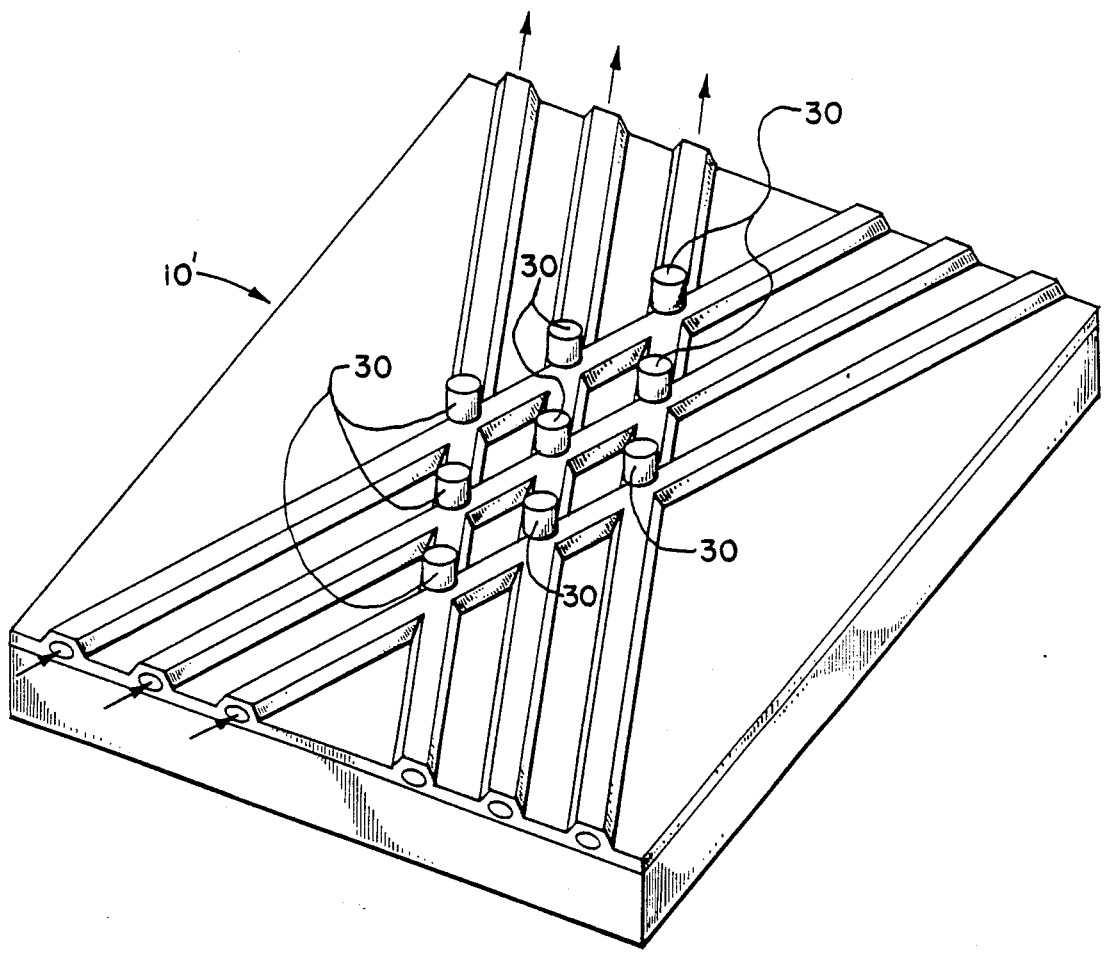
FIG. 7 is an alternate embodiment of the optically controlled integrated optical switch of this invention shown in pictorial fashion, illustrating NXN channel waveguides with $N^2$ independent electro-optical control sources.

FIG. 7 of the drawings illustrates an alternate embodiment 10' of the optically controlled integrated optical switch of this invention. In this embodiment of the invention an N×N guided-wave optical switching network is formed by a nonblocking 3×3 optical cross bar matrix that includes nine independent lead-wire pairs to the optical sources 30. The electronic suppliers are not shown in FIG. 7 but are identical to those set forth with respect to the optical switch 10 illustrated in FIGS. 1–3 of the drawings.

MODE OF OPERATION

The operation of the optically controlled integrated optical switch 10 of the present invention is set forth with respect to FIGS. 1–3 of the drawings although both embodiments of the present invention basically undergo the same mode of operation. More specifically, the control beam 16 emitted from optical source 18 generates $N_{eh}$ electron-hole pairs per cm$^3$ of waveguide material. The change in the materials refractive index an is proportional to $N_{eh}$, and the physical effect of beam 16 is to decrease the refractive index of the material, thereby altering the waveguide mode index. This index change is approximately $1^{+3}$ when $N_{eh}=10^{18}$ pairs/cm$^3$, a perturbation adequate for total optical switching in an interaction length of L of about 650 micrometers. It is assumed that the crystalline silicon waveguide material is very lightly doped such that the residual carrier concentration is much less that the injected concentration.

The waveguide intersection area 15 absorbs a fraction, f, of the normally incident optical control power, where:

$f = 1 - \exp(-\alpha_\lambda L)$; and $\alpha_\lambda$ = optical absorption coefficient at the control wavelength $\lambda$.

The optical source 18 which may be in the form of a commercial GaAlAs LED generally has a output centered at $\lambda=850$ nm. The known absorption spectrum of the crystalline silicon (x−Si) at room temperature indicates that $\alpha(850)=900$ cm$^{-1}$. This implies that f=47% when T=7 $\mu$m. This is a useful absorbance. Slightly more efficient control is obtained when f=63.2%, the condition where $\alpha=1/T$ Here $\alpha=1429$ cm$^{-1}$ for T=7 $\mu$m and the control wavelength is 770 nm. Anti-reflection coatings may be used on the waveguide faces for improved efficiency. For a 50 mW optical source, the optical power density on the guide is approximately $10^3$ W/cm$^2$ The 2 WL intersection supports two modes $\beta_{00}$ and $\beta_{01}$. The length L is chosen to give "straight through" optical propagation in switch 10 for zero control-light power. The applied control light will alter the mode index $\beta_{00}$ and $\beta_{01}$ but not $\beta_{01}$ when light covers the area 2 WL. As a result, the phase difference $\Delta\phi$ is altered and the two optical outputs of switch 10 as shown in FIG. 1 of the drawings will have optical power levels described by $P_3/P_1 = \sin^2(\Delta\phi/2)$ and and $P_4/P_1 = \cos^2(\Delta\phi/2)$.

At a sufficiently high level of control-light power, the modes now combine (interfere) to give total output in the crossguide (complete switching occurs). This occurs because $\Delta\beta$ is proportional to $N_{eh}$ which in turn is proportional to the optical control power. If the control beam covers the left half of the intersection (WL), it will perturb the $\beta_{01}$ mode but not $\beta_{00}$, which offers an alternate means of control.

The optical control power $P_c$ required for complete switching can be calculated from the relation $P_c = N_{eh}Ah\nu/\alpha T$, where A is the illuminated intersection area, $h\nu$ is the photon energy in the control beam, and $\gamma$ is the carrier recombination time. If we assume that $10^{18}$ electron-hole pairs/cm$^3$ are needed for full switching, then we find that $P_c=38$ mW is required in the case where A=12 $\mu$m×650 $\mu$m, $h\nu=1.37$ eV, $\alpha=900$ cm$^{-1}$ and $\gamma=0.5$ $\mu$sec. .

Although this invention has been described with reference to particular embodiments, it will be understood that this invention is also capable of further and other embodiments within the spirit and scope of the appended claims.

We claim:

1. An optically-controlled integrated optical switch, comprising:
    a body made up entirely of crystalline silicon:
    an X-like channel waveguide structure having a first leg and a second leg formed within said silicon body, said first and said second legs intersecting to form an intersection crossover region of predetermined size; and
    means for providing a beam of light impinging on said intersection crossover region in order to alter the index of refraction of said silicon body and therefore changing the cross-coupling of light between said first leg and said second leg of said X-like channel waveguide structure.

2. An optically-controlled integrated optical switch, as defined in claim 1 wherein said beam of light is of a wavelength in the range of 450 nm–950 nm.

3. An optically-controlled integrated optical switch, as defined in claim 1 wherein said light beam providing means comprises a light source and means for varying the optical power emitted by said light source.

4. An optically-controlled integrated optical switch, as defined in claim 3 wherein said beam of light is of a wavelength in the range of 450 nm–950 nm.

5. An optically-controlled integrated optical switch as defined in claim 4 wherein said X-like channel waveguide structure transmits light at a wavelength of 1.3 $\mu$m or greater.

6. An optically-controlled integrated optical switch as defined in claim 5 wherein said body is made up of a crystalline silicon waveguiding layer grown epitaxially on a crystalline silicon substrate.

7. An optically-controlled integrated optical switch as defined in claim 6 wherein each of said legs of said X-like channel waveguide structure has a rib-shaped cross-section with an epitaxial layer thickness of 5–10 microns, a rib-height of approximately 3 microns and a rib width of approximately 5–7 microns.

8. An optically-controlled integrated optical switch as defined in claim 7 wherein the width of said intersection crossover region is approximately equal to twice said rib width of one of said legs of said X like channel waveguide structure.

9. An optically-controlled integrated optical switch as defined in claim 3 wherein said light source comprises a monolithic laser diode array.

10. An optically-controlled integrated optical switch as defined in claim 3 further comprising means optically aligned with said light beam providing means for providing a rectangular output therefrom that exactly fills said intersection region at normal incidence.

11. An optically-controlled integrated optical switch as defined in claim 3 wherein said light source comprises an edge emitting light emitting diode.

12. An optically-controlled integated optical switch as defined in claim 3 further comprising means optically aligned with said light beam providing means for directing said light beam to an upstanding side of said intersection crossover region.

13. An optically-controlled integrated optical switch as defined in claim 12 wherein said light directing means comprises a ribbon-type waveguide.

14. An optically-controlled integrated optical switch as defined in claim 8 wherein said light source comprises a monolithic laser diode array.

15. An optically-controlled integrated optical switch as defined in claim 8 further comprising means optically aligned with said light beam providing means for providing a rectangular output therefrom that exactly fills said intersection region at normal incidence.

16. An optically-controlled integrated optical switch as defined in claim 8 wherein said light source comprises an edge emitting light emitting diode.

17. An optically-controlled integrated optical switch as defined in claim 8 further comprising means optically aligned with said light beam providing means for directing said light beam to an upstanding side of said intersection crossover region.

18. An optically-controlled integrated optical switch as defined in claim 17 wherein said light directing means comprises a ribbon-type waveguide.

19. An optically-controlled integrated optical switch as defined in claim 1 comprising a plurality of X-like channel waveguide structures within said silicon body, each of said waveguide structures forming an intersection crossover region, and a plurality of independent beam providing means, each of said beam providing means impinging a beam of light on said crossover region of each of said waveguide structures, respectively.

* * * * *